United States Patent [19]
Kopp et al.

[11] Patent Number: 5,450,557
[45] Date of Patent: Sep. 12, 1995

[54] SINGLE-CHIP SELF-CONFIGURABLE PARALLEL PROCESSOR

[75] Inventors: Randall L. Kopp, Irvine; S. Val Johnson, Anaheim, both of Calif.

[73] Assignee: Loral Aerospace Corp., New York, N.Y.

[21] Appl. No.: 269,969

[22] Filed: Jun. 29, 1994

Related U.S. Application Data

[63] Continuation of Ser. No. 995,943, Dec. 18, 1992, abandoned, which is a continuation of Ser. No. 434,070, Nov. 7, 1989, abandoned.

[51] Int. Cl.⁶ .................................. G06F 7/00
[52] U.S. Cl. .............................. 395/375; 395/800; 364/DIG. 1; 364/231.8; 364/232.2; 364/229.4; 364/229
[58] Field of Search ................... 395/800, 375, 325

[56] References Cited

U.S. PATENT DOCUMENTS

| | | | |
|---|---|---|---|
| 4,740,895 | 4/1988 | Sargent et al. | 395/575 |
| 4,807,183 | 2/1989 | Kung et al. | 364/900 |
| 4,811,214 | 3/1989 | Nosenchack et al. | 395/800 |
| 4,858,113 | 8/1989 | Saccardi | 395/325 |
| 4,967,340 | 11/1990 | Dawes | 395/800 |
| 5,020,059 | 5/1991 | Gorin et al. | 371/11.3 |
| 5,034,907 | 7/1991 | Johnson et al. | 364/724.16 |
| 5,103,311 | 4/1992 | Sluijter et al. | 558/160 |

FOREIGN PATENT DOCUMENTS 0286183  10/1988  European Pat. Off. .
0286184  10/1988  European Pat. Off. .

OTHER PUBLICATIONS

Labrouse et al. "Create-Life: A Design System for High Performance ULSI Circuits" IEEE, 1988.
Chang et al. "A Flexible High Performance 2-D Discrete Cosine Transform" ISCAS 89, May 1989.
"At 100 mFlops, the Fastest DSP Chip Ever!" Gunn, *Electronic Design* Oct. 1988.

*Primary Examiner*—Eric Coleman
*Assistant Examiner*—L. Donaghue
*Attorney, Agent, or Firm*—Harry G. Weissenberger; Anthony J. Karembelas

[57] ABSTRACT

A self-contained, self-configurable cascadable pipelined processor chip (160) is diclosed. The chip contains a computation section (FIGS. 1a–1d) which consists of various types of computation circuits (20–42) that can be software-interconnected in any desired configuration by a set of multiplexers (44–52) whose settings are under the control of a control section (FIG. 2). The control section consists of various types of control circuits (60–76) which are also software-interconnectable in any desired configuration under program control. The chip (160) is configured by a very long instruction word and then executes the algorithm defined by that configuration iteratively until stopped. The chip (160) can be programmed to reconfigure itself in response to computation results or other selectable parameters, either in accordance with internally stored configurations or in accordance with configuration information stored in an external random access memory (56, 58). Internal reconfiguration requires no separate reconfiguration time at all, and external reconfiguration can be accomplished in less than 10 μs.

9 Claims, 13 Drawing Sheets

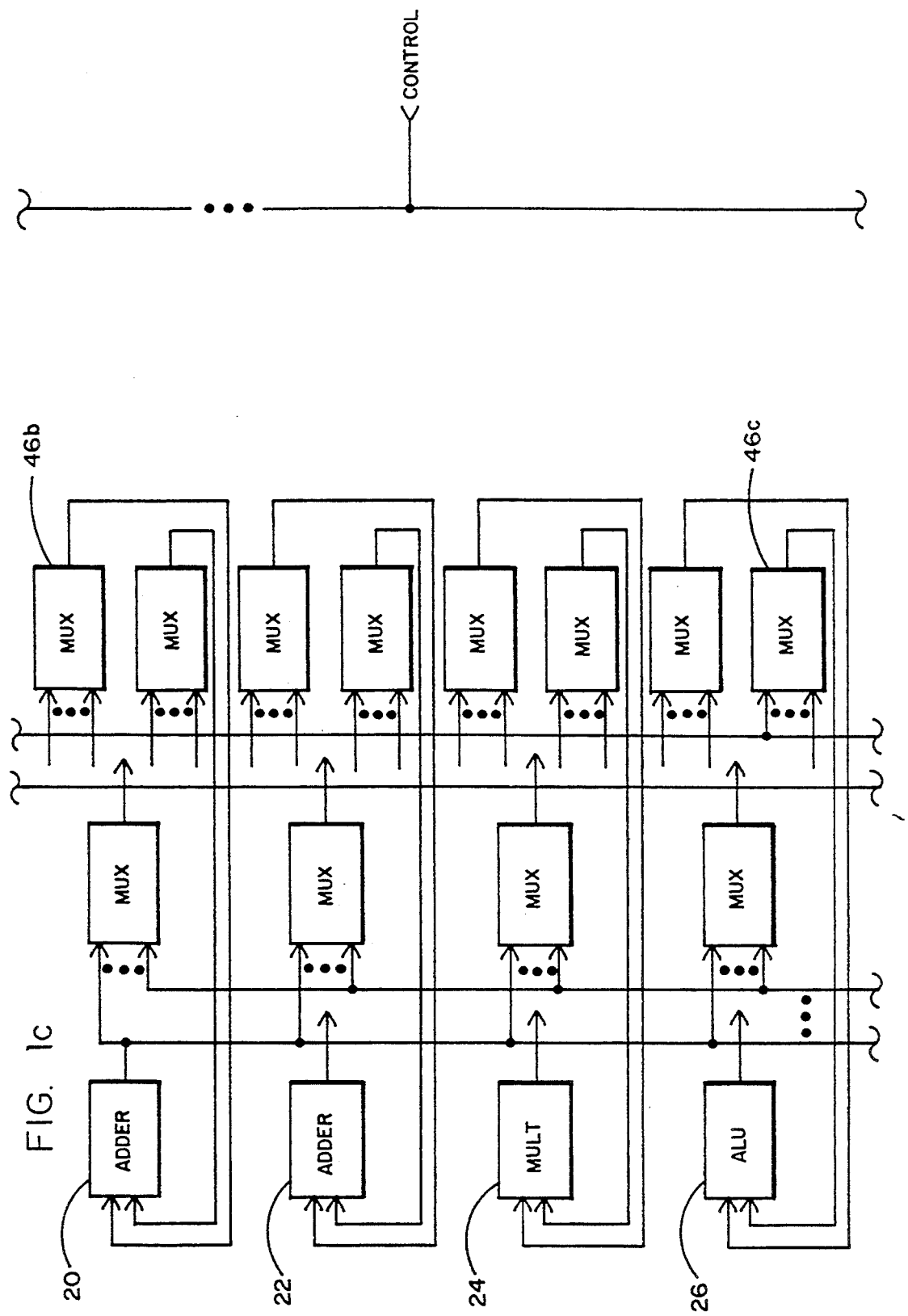

SINGLE-CHIP SELF-CONFIGURABLE PARALLEL PROCESSOR

LICENSE RIGHTS

This is a Subject Invention under U.S. Army Missile Command Contract No. DAAH01-85-C-A138. The United States Government may have certain license rights under that contract.

This application is a continuation of application Ser. No. 07/995,943 filed 18 Dec. 1992, now abandoned, which is a continuation of application Ser. No. 07/434,070 filed 07 Nov. 1989, now abandoned, both entitled "SELECTIVELY SELF-CONFIGURABLE PROCESSOR FOR ITERATIVELY PROCESSING DATA".

FIELD OF THE INVENTION

This invention relates to high-speed computational processors, and more particularly to a processor which is self-configuring under software control.

BACKGROUND OF THE INVENTION

A variety of applications, as for example real-time imaging for missiles, require a cyclic series of sets of repetitive computations to be reliably made at an extremely rapid rate with a minimum of hardware. Existing processors are inherently limited in speed by their need to fetch an instruction from memory, execute it, and store the result, in every operational cycle. Also, known processor chips require external support circuitry such as decoders, buffers, etc., and they require substantial drive power. Furthermore, timing problems and input-output delays make it difficult for conventional processors to do large-scale parallel processing without a large amount of hardware, and testing is difficult.

Prior art in this field includes a processor manufactured by Zoran Corporation of Santa Clara, Calif. which computes a fast Fourier transform (FFT) with n points on a single instruction, but which is not programmable; and U.S. Pat. No. 4,807,183 which shows an interconnection chip with a software-configurable crossbar array but without on-chip computational circuits.

DESCRIPTION OF THE INVENTION

The invention provides a self-contained, self-configuring cascadable pipelined processor chip (160) which can be programmed to configure itself into any desired configuration or series of successive configurations. The processor consists of a set of computation circuits such as input-output circuits (I/Os) (40) counters (38), adders (20, 22), a multiplier (24), arithmetic logic units (ALUs) (26, 28), comparators (30, 32), and a shifter (34) which can be selectively software-interconnected by an array of multiplexers (MUXs) (36, 44–52). The use of MUX arrays makes possible a much more powerful processor on a single chip than would be possible with a conventional crossbar arrangement.

The computation circuits and computation MUXs (20–52) are controlled by control circuits (60–76) which are themselves software-configurable. The control circuits include mode/state flip-flops (60), delay lines (62, 64), AND or OR logics (66–68), and I/O circuits (70–76) including random access memory (RAM) selects and enables (72), RAM writes (74), and a stop run output (76). Like the computational circuits (20–42), the control circuits (60–76) are selectively software-interconnectable by a MUX array (82).

A salient feature of the inventive processor is that, unlike conventional microprocessors, it is configured by a very long instruction word (VLIW), and then iteratively executes an algorithm defined by that configuration until stopped and reconfigured by the next VLIW. In accordance with the invention, VLIWs can be loaded into the processor chip (160) two at a time, with the processor automatically switching from one configuration to the other by a single address value change on one line (54) common to a group of MUXs (48–52)—an operation which can be performed during calculation without loss of time. An entirely different configuration can be loaded from RAM (56, 58) by the processor (160) itself in ten microseconds or less, depending upon the number of control MUX inputs that need to be changed.

The inventive processor also overcomes the difficult timing problem in pipelines of lining up data in one path with controls or data in other paths. The inventive processor does this by providing selectable delay registers (106, 62, 64) in the computational and control circuits (20–32) so that data timing can be varied as necessary for proper alignment in each computational and control circuit.

Due to their high I/O and clock rates, the use of many dedicated pins, and the consequent availability of many meaningful results in a short time, several of the inventive processors (160) can be readily arrayed or cascaded to provide paralleling of dependent operations such as wavefront processing.

Finally, the rapidly changeable configuration, of the inventive processor makes it practical to run frequent self-tests of each chip to assure the continuing reliability of computation results.

BRIEF DESCRIPTION OF THE DRAWINGS

FIG. 1b, 1c, 1d are a block diagram of the MUX array of the computational section;

DESCRIPTION OF THE PREFERRED EMBODIMENT

Figure 1A:
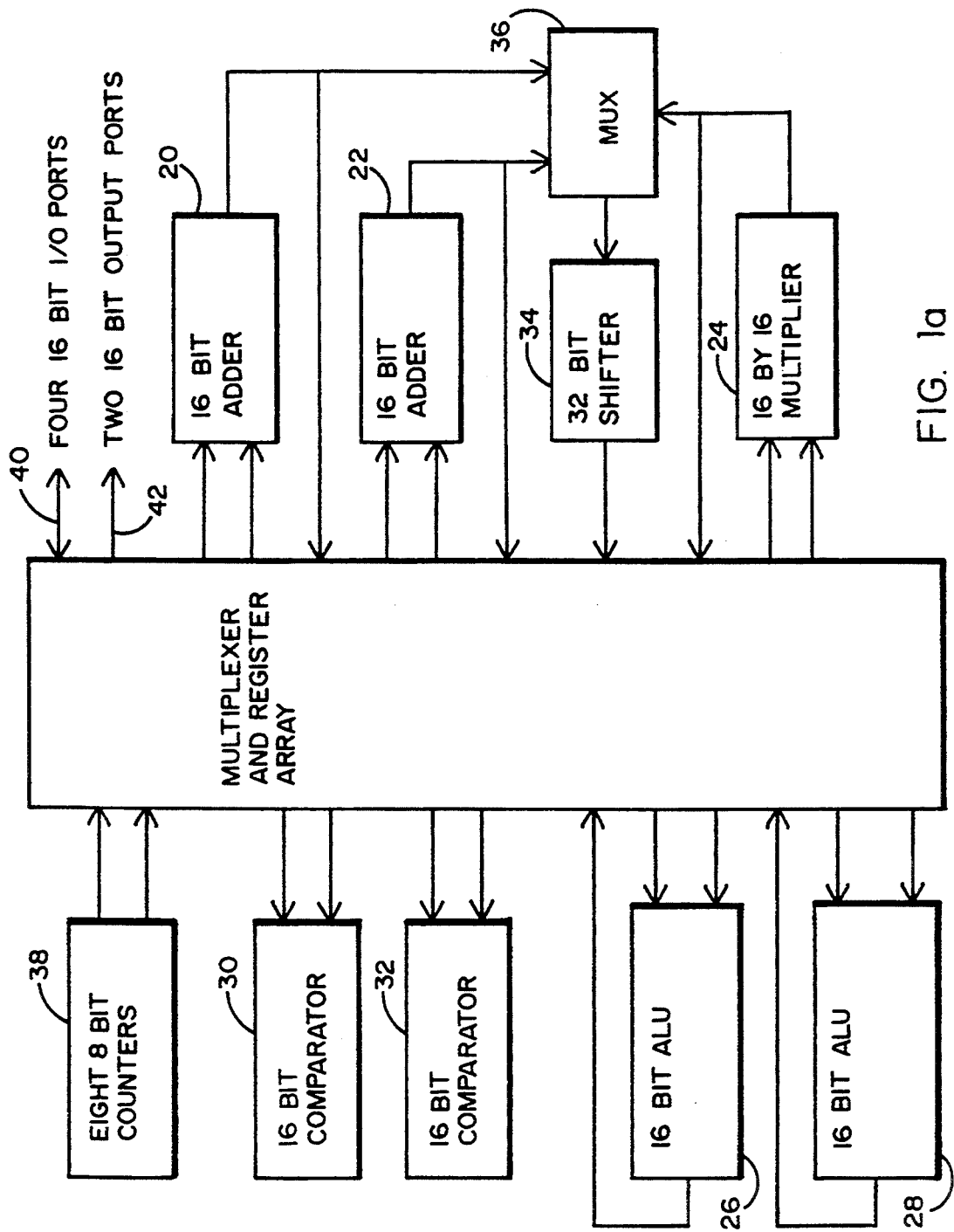
FIG. 1a is an overall block diagram of the computational section of the processor chip.

FIG. 1a shows the overall arrangement of the data paths of the configurable pipelined processor (CPP) of this invention. Computations are performed, in the preferred embodiment, by two 16-bit adders 20, 22, a 16×16-bit multiplier 24, two 16-bit ALUs 26, 28, two 16-bit comparators 30, 32, and a 32-bit shifter 34. The input to the shifter 34 can be selected by a MUX 36 to be the output of adder 20 and adder 22, or of multiplier 24. Eight 8-bit counters 38 can provide RAM addressing, accumulate computational results, or control the iterations of the computational circuitry of FIG. 1a.

Four 16-bit I/O ports 40 and two 16-bit output ports 42 are provided for data input and output to and from the CPP.

Figure 1B:
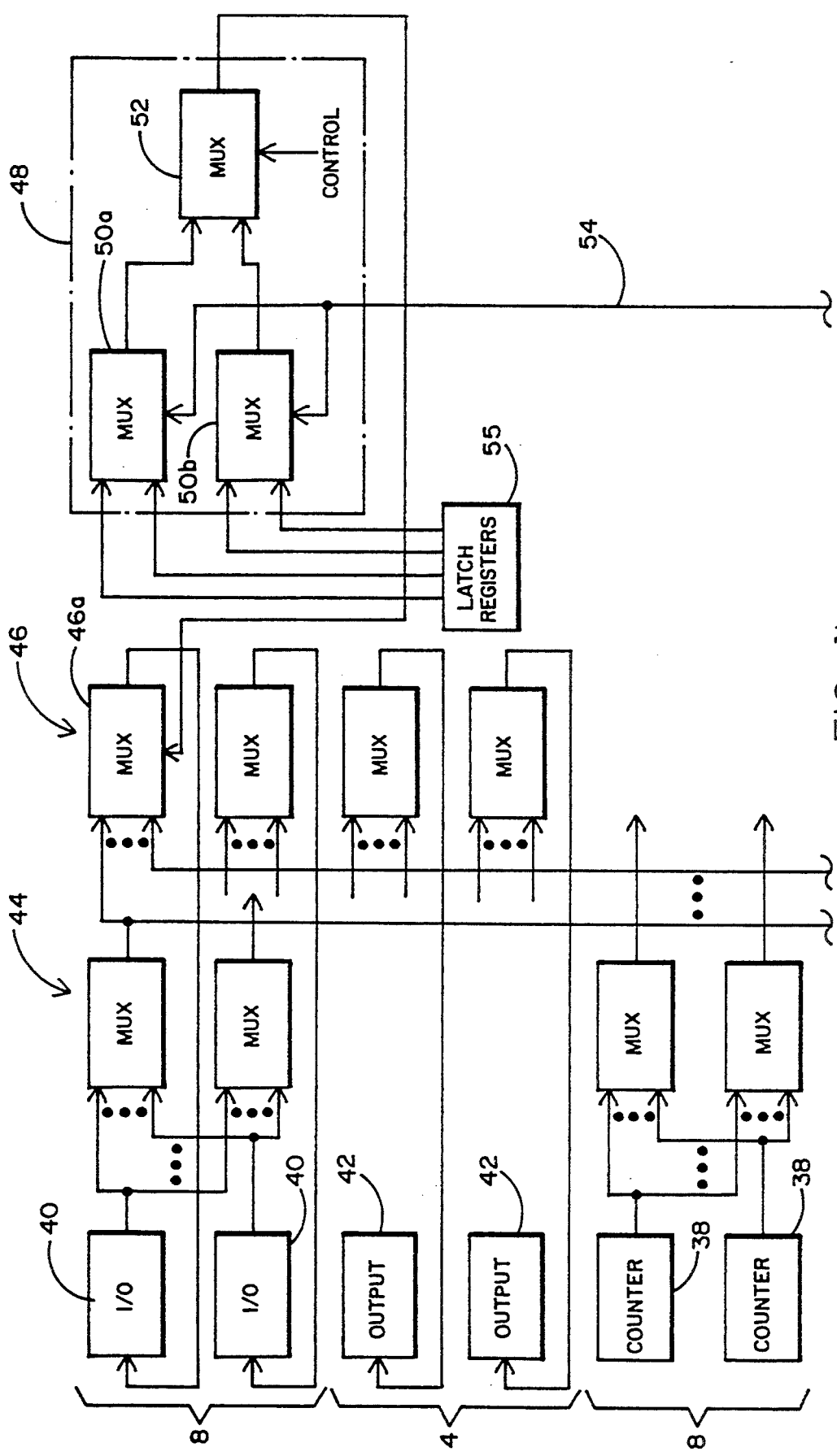
Figure 1D:
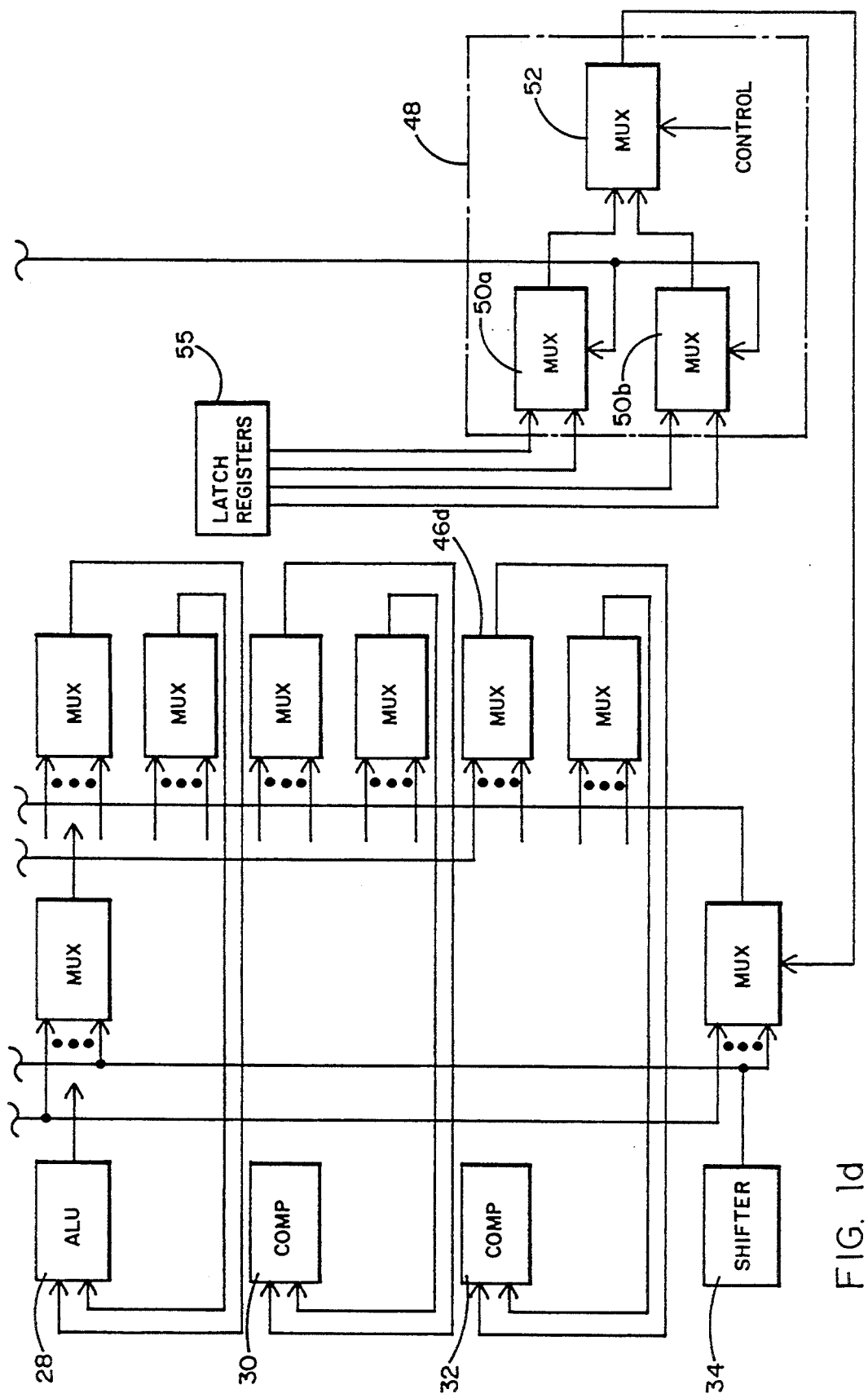

The computational elements of FIG. 1a are selectively interconnected under software control by the MUX array of FIG. 1b-d. In that figure, it will be seen that the eight I/O circuits 40 (two 8-bit circuits for each 16-bit port), the eight counters 38, and the computing circuits 20 through 28 and 34 are connected, respectively, to groups of first-level MUXs 44.

The output of MUXs 44 is connected to the inputs of second-level MUXs 46. There is one second-level MUX 46 for each input of each of the circuits 20 through 42 except the counters 38 (which have no data input) and the shifter 34 (which has its own input MUX 36, FIG. 1a). Each MUX 46 has its output connected to one of the inputs of a circuit 20 through 42. The second-level MUXs 46 are mostly eight-input MUXs, and the inputs of the second-level MUX 46 are distributed in different combinations among the outputs of first-level MUXs 44 in such a way as to provide the best selection of data among the twenty-six MUXs 46. Specific interconnections are shown as a matter of example in inputs of MUXs 46a, 46b, 46c and 46d. The inputs of the other MUXs 46 have been left unspecified in FIG. 1b-d for clarity.

Figure 10:
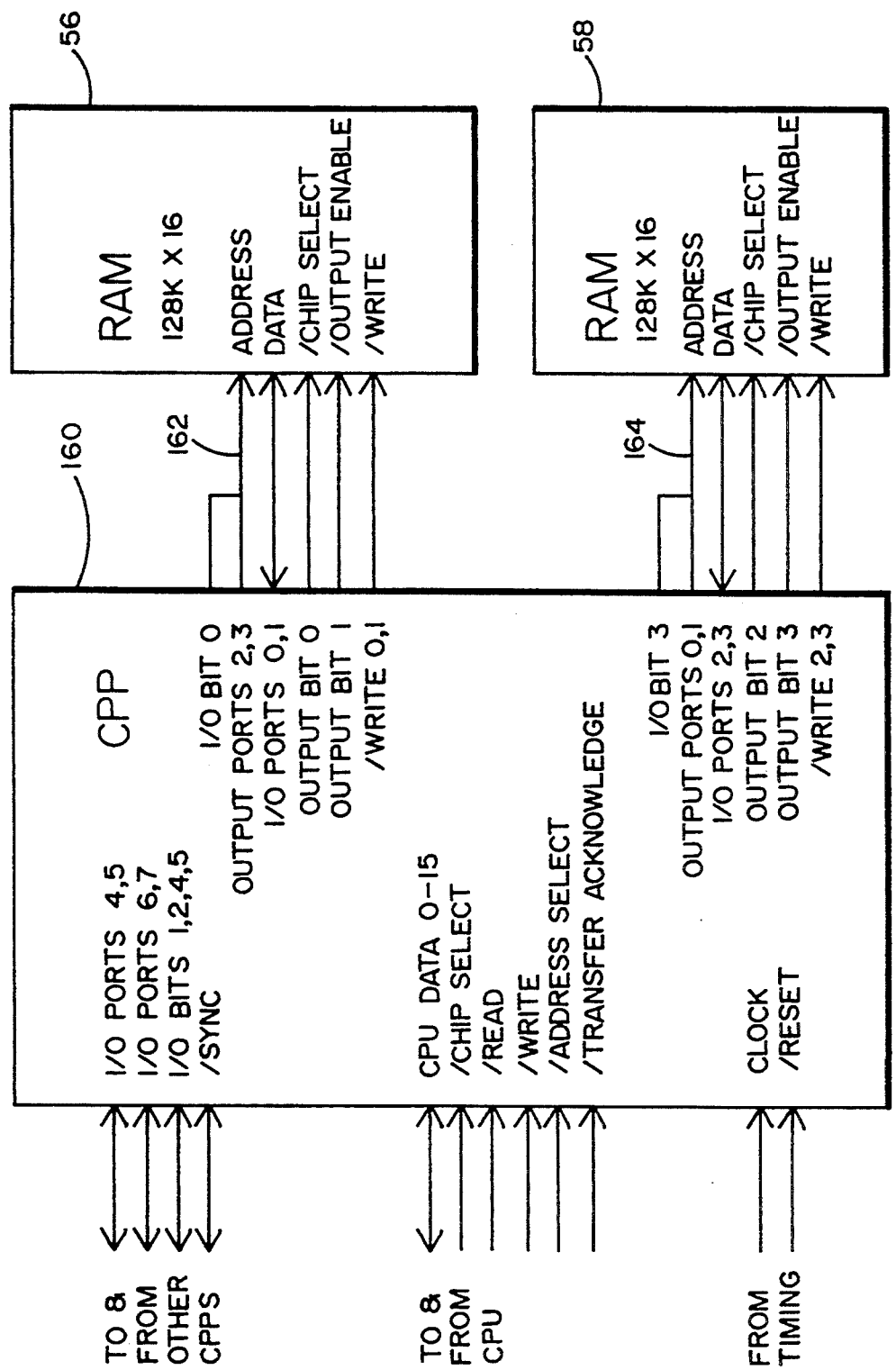
FIG. 10 is a block diagram showing the interfacing between a processor of this invention and its RAM chips as well as other processors.

The input selection of MUXs 44 and 46 is controlled by sets 48 of control MUXs, each of which includes a pair of switching MUXs 50a, 50b and an individual control MUX 52. The switching MUXs 50a and 50b each have inputs which can be toggled by a single address change on master control line 54. Each input of each switching MUX 50a or 50b is connected to a latch register 55 into which a desired address can be loaded from the program RAMs 56, 58 (FIG. 10). It will be seen that the configuration of the computational elements of the CPP chip shown in FIG. 1b-d can be instantly toggled between two configurations by changing the control bit on line 54.

The individual control MUXs 52 can be individually toggled by a separate control bit to select either switching MUX 50a or switching MUX 50b as the address source for the MUX 44 or 46 associated with it.

It will be seen that the input to any circuit 20 through 42 of FIG. 1b-d can be connected to the output of any other circuit 20 through 42 using the multiplexers 44 through 52. The multiplexers also allow the output of one circuit to connect to the input of several circuits. This interconnection flexibility allows the CPP to achieve computational performance that is comparable to a custom part design tailored to a specific application, yet without the time, cost, and risk of a custom design. Data that control the multiplexers and thus determine how the elements are connected are stored in the on-chip latches 55. To execute a program, the CPP performs a load instruction (usually in response to a predetermined calculation circuit status, i.e. a predetermined result or number of iterations) that reads data from an off-chip RAM 58 and stores the data in the latches 55. The time required to load a new program is less than 10 microseconds, depending upon the number of multiplexer paths that must be changed from the previous program. Other CPP instructions are used to store CPP register contents in the off-chip RAMs 56, 58 or to load a CPP register from the off-chip RAMs. This is particularly useful for passing intermediate computational results between different programs.

Figure 2:
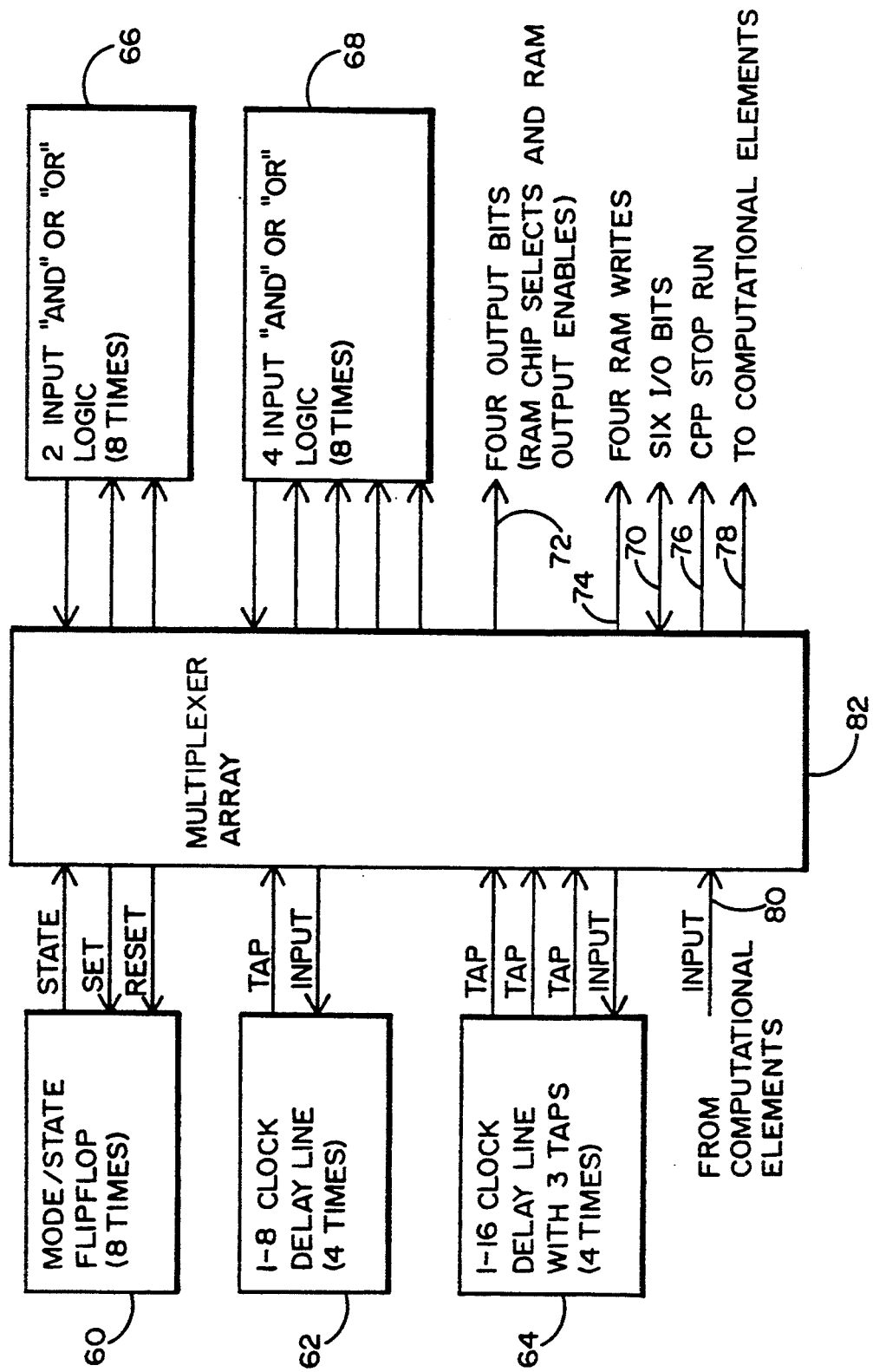
FIG. 2 is an overall block diagram of the control section of the processor chip.

FIG. 2 shows the control section of the CPP chip of this invention. The control circuits include mode/state flip-flops 60, delay lines 62, 64 AND or OR logics 66, 68, a six-bit I/O 70, and three dedicated outputs 72, 74, 76. In addition, connections 78, 80 to and from the computation section of FIG. 1a are provided. The control circuits 60 through 80 are selectively interconnectable by a MUX array 82 similar to that shown in FIG. 1b-d.

In operation, control logic is provided to allow the output of the comparators 30, 32 and 148, the last count indication from the counters 38, the carry output of the adders 20, 22 and ALUs 26, 28, or a data bit on, e.g., line 54 to affect any function controlled by the data path multiplexer latch bits in latch registers 55. Control logic is also provided for the load, clear, and count enable of all counters 38. In addition, the AND or OR gates 66, 68 in the control logic of FIG. 2 allow control equations to be formed with several control signal inputs. Delay circuitry 62, 64 is provided to allow the effect of a control signal to be delayed by a selectable number of clock cycles. There are eight mode or state flip-flops 80 that dan be set or reset by other control logic and then used as inputs to the equation-forming logic. All of this control logic is configurable through the multiplexer array 82 controlled by on-chip latches in latch registers 55.

Figure 3:
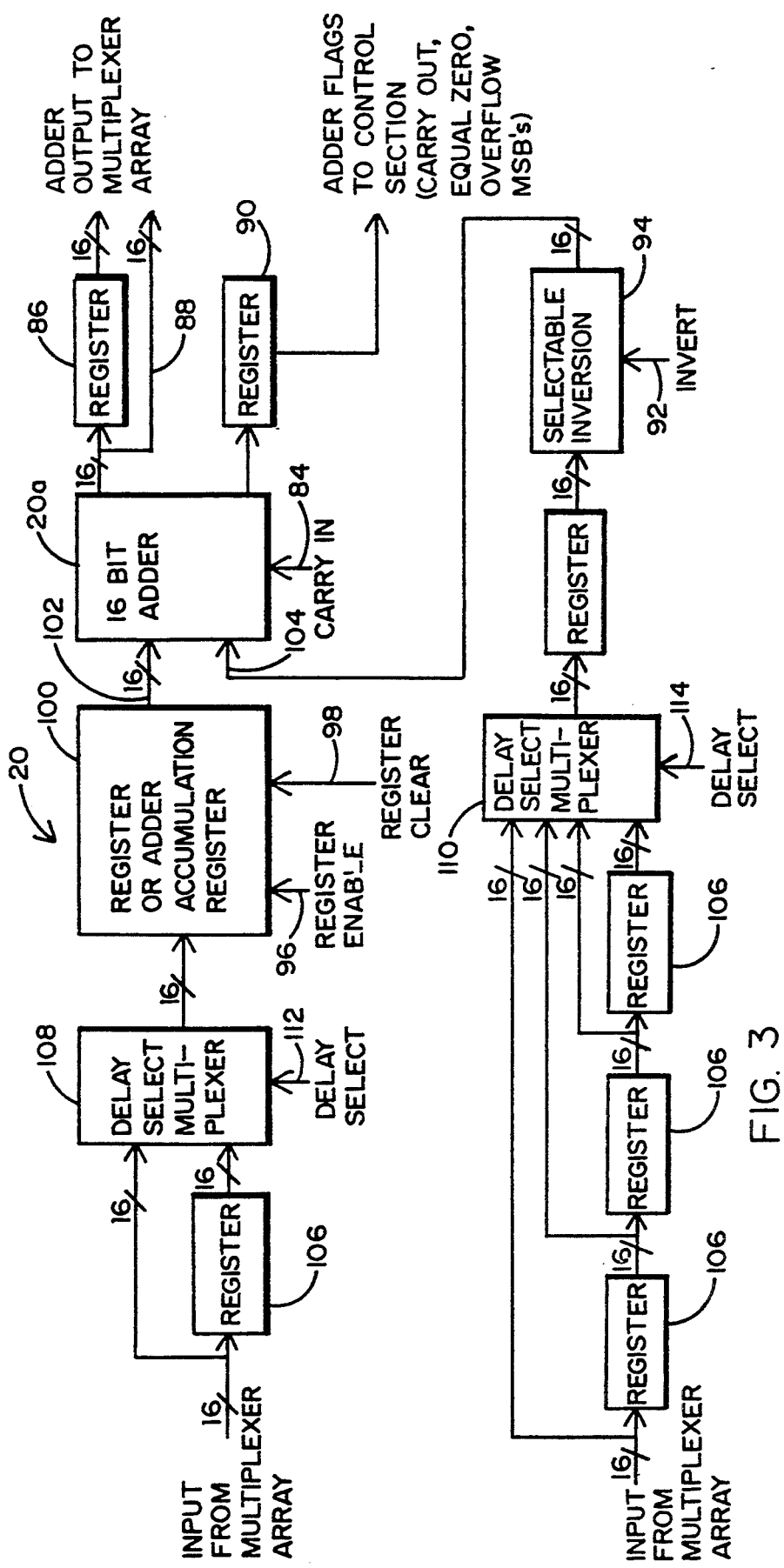
FIG. 3 is a block diagram of an adder.

FIG. 3 shows the 16-bit adders 20, 22, which are identical. Each of the adders 20, 22 can be programmed to be an adder (or subtractor), an accumulator, or a comparator. The carry-in 84 to the adder comes (directly or indirectly) from the control path multiplexers 82 (FIG. 2). One of the adders can also get the carry-in directly from the other adder output register 86. The adder output is registered before going into the data path multiplexers 44 (FIG. 1b-d-d-d). The adder output path 88 that bypasses the output register 86 is used only to connect the adder 20 or 22 as an accumulator. The adder sends carry-out, equal-zero, and overflow flags, as well as the most significant bit of the inputs and output to the control circuitry of FIG. 2 through flag register 90.

It should be noted that the availability of the carry-out signal to the control section, and the availability of a carry-in signal from the control section, makes it possible to configure the control section to use the carry for control functions—for example, preventing addition of a "1" to an all-"1" result from producing an all-"0" result.

The adder circuit 20 or 22 can be converted into a subtractor or comparator by the invert flag 92 to the inverter 94, and into an accumulator by the register enable and register clear flags 96, 98 to the accumulation register 100.

In order to line up the calculated data with other data and with control functions, the inputs 102, 104 of the adder logic 20a are provided with serially connected delay registers 106 which can be selectively switched into and out of the adder circuit 20 by delay select MUXs 108, 110 whose control inputs 112, 114 are operated by latches 55.

Figure 4:
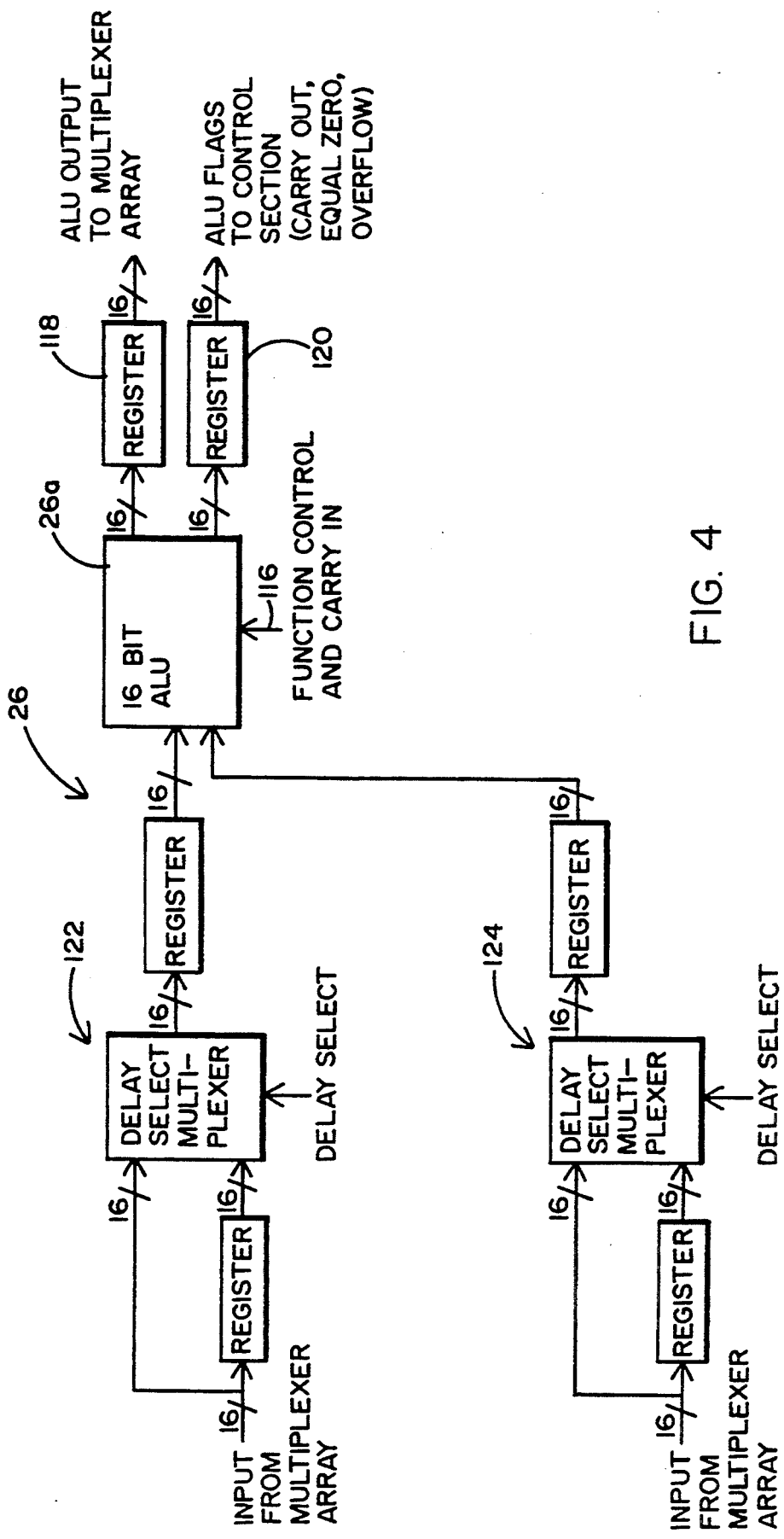
FIG. 4 is a block diagram of an ALU.

FIG. 4 shows one of the two identical ALUs 26, 28. Each of the ALUs 26 or 28 can be programmed to perform an addition (or subtraction), a compare, or a logic function. Logic functions available include AND, OR, EXCLUSIVE-OR, and various combinations of inverted inputs and outputs. The function control and carry-in 116 to the ALU comes (directly or indirectly) from the control multiplexers 82. The ALU output is registered at 118 before going into the data path multiplexers. The ALU sends carry-out, equal-zero, and overflow flags as well as the most significant bit of the inputs and output to the control circuitry through register 120. Delay selections 122, 124 are available as in the adder 20 of FIG. 3.

Figure 5:
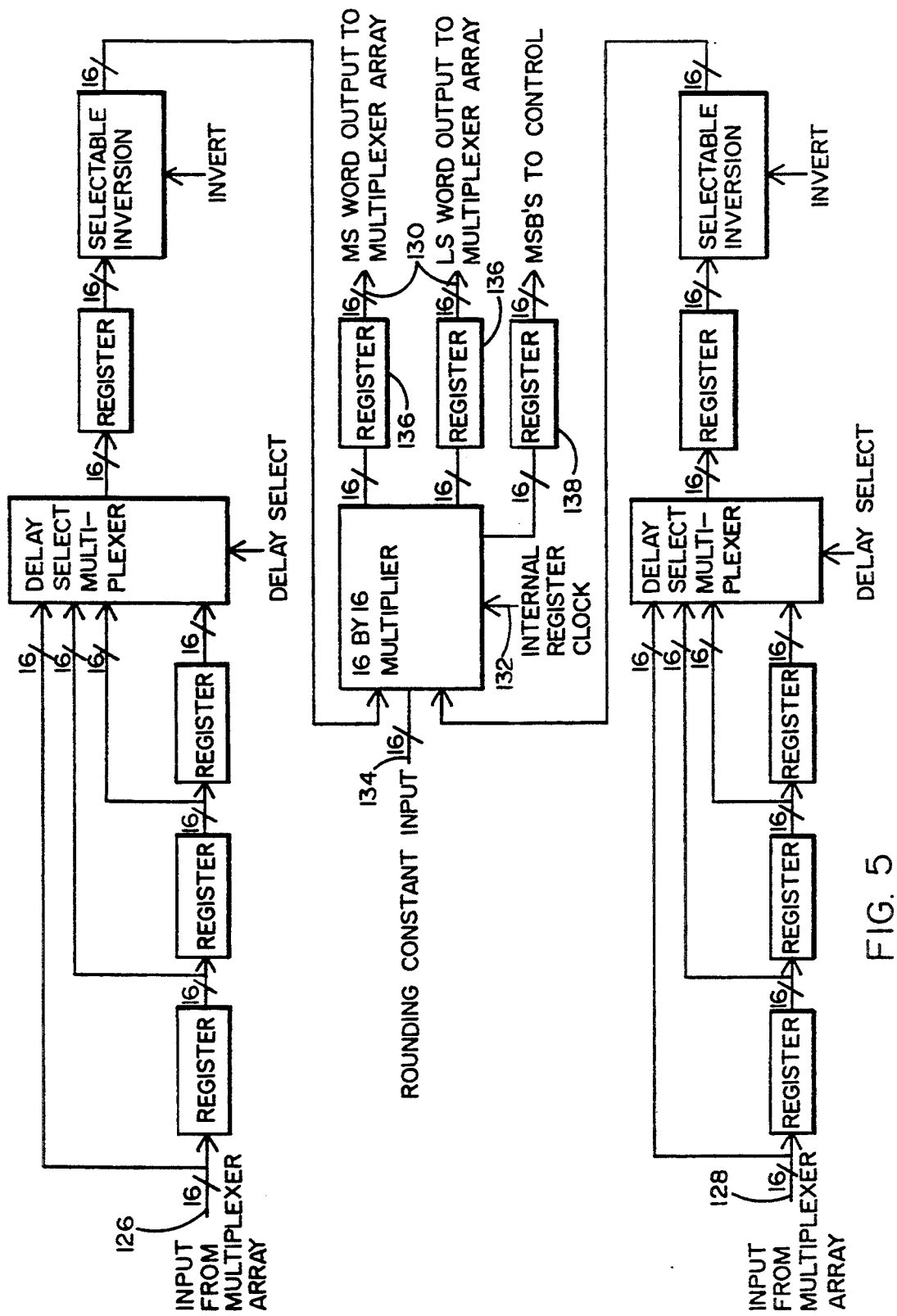
FIG. 5 is a block diagram of a multiplier.

The multiplier logic 24a of the 16×16-bit multiplier 24 of FIG. 5 has an internal pipeline register (not shown). The internal register allows the multiplier logic 24a to work at the full clock speed. Data can be presented to the inputs 126, 128, and data is available at the output 130, on every clock 132. If the full output is not being used and rounding is desired, a rounding constant input 134 is available. The multiplier output is registered at 136 before going into the data path multiplexers 44. The multiplier 84 sends the most significant bit of the inputs and output to the control circuitry. Delay and inversion functions are available as in the adder 20.

Figure 6:
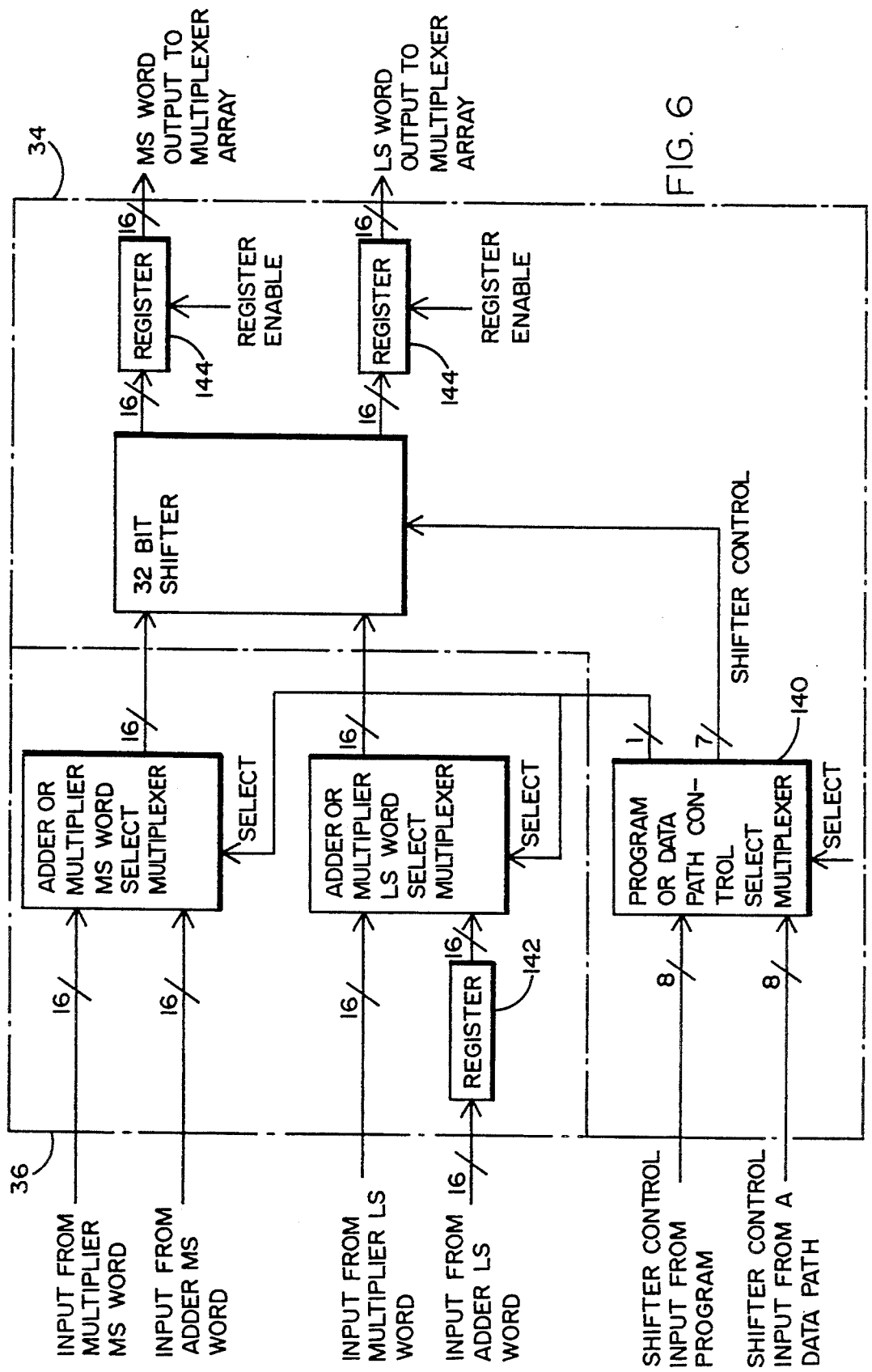
FIG. 6 is a block diagram of the shifter.

The 32-bit shifter 34 of FIG. 6, depending upon the setting of MUX 36, can take its input from the output of multiplier 24 or from the combined output of the two adders 20, 22. The shifter 34 can provide four types of shift functions with a shift range of zero to thirty-one bits. The available shift functions are rotate (barrel shift), shift left or right filling with zeros, and shift right filling with the sign bit. By means of the MUX 140, the shift function and input selection can be chosen by the CPP program, or they can be programmed to be controlled by a data bus within the CPP. The least significant word of the adder input is delayed in register 142 to realign it with the most significant word during 32-bit operations. The shifter output is registered at 144 before going into the data path multiplexers 44.

Figure 7:
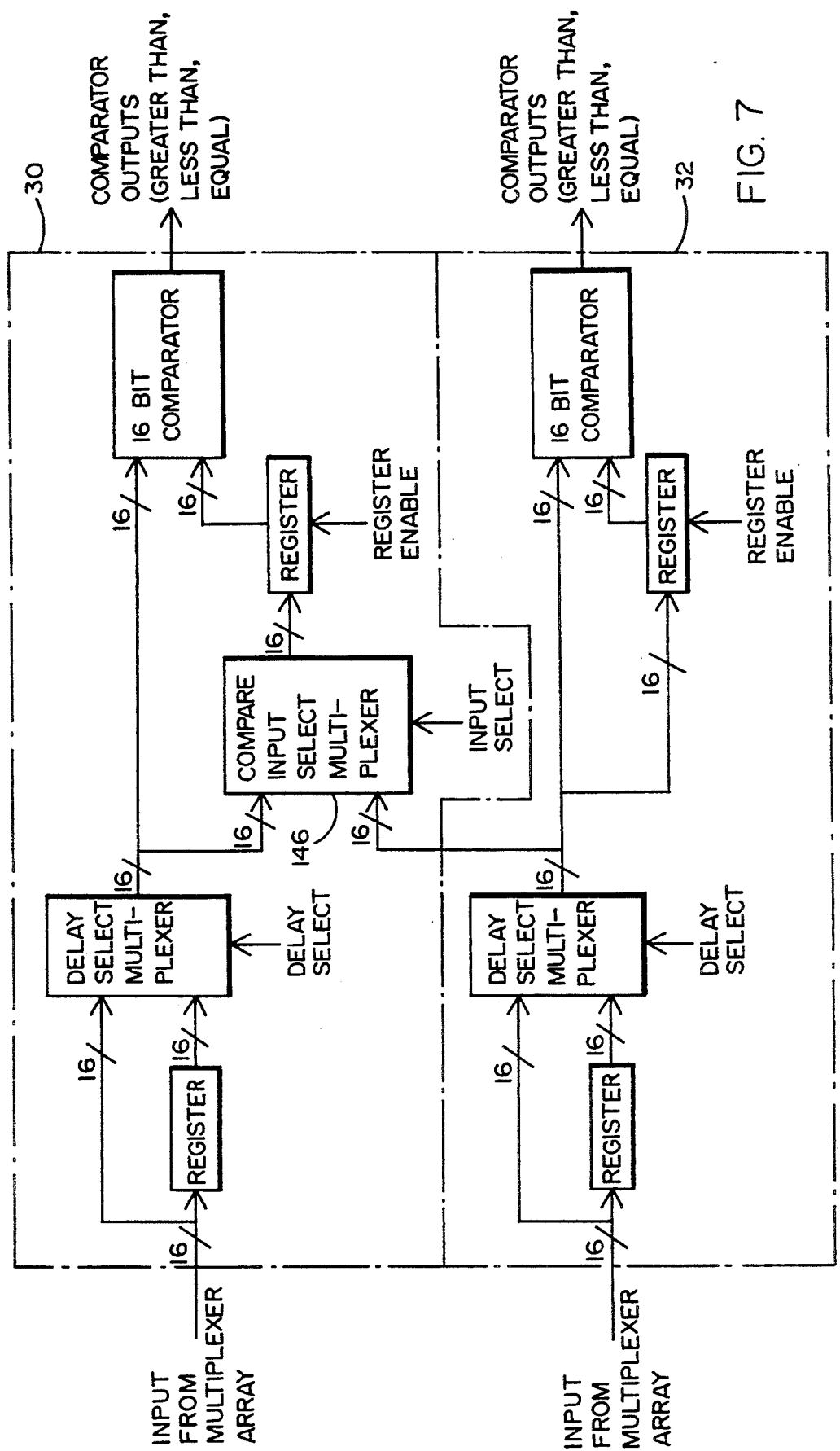
FIG. 7 is a block diagram of a comparator.

The CPP of this invention has two 16-bit comparators 30, 32 (FIG. 7) that are specifically designed to find the minimum or maximum value in a stream of data. Data can be input to each comparator on each clock. Each comparator can be programmed to find the minimum or maximum value for unsigned data or for two's complement data. The two comparators can be combined to find the minimum or maximum value of 32-bit data at the full clock rate. In addition, the comparator 30 can be programmed by MUX 146 to compare the two data inputs to the comparators 30, 32. Selectable alignment delays are provided as for the adder 20.

Figure 8:
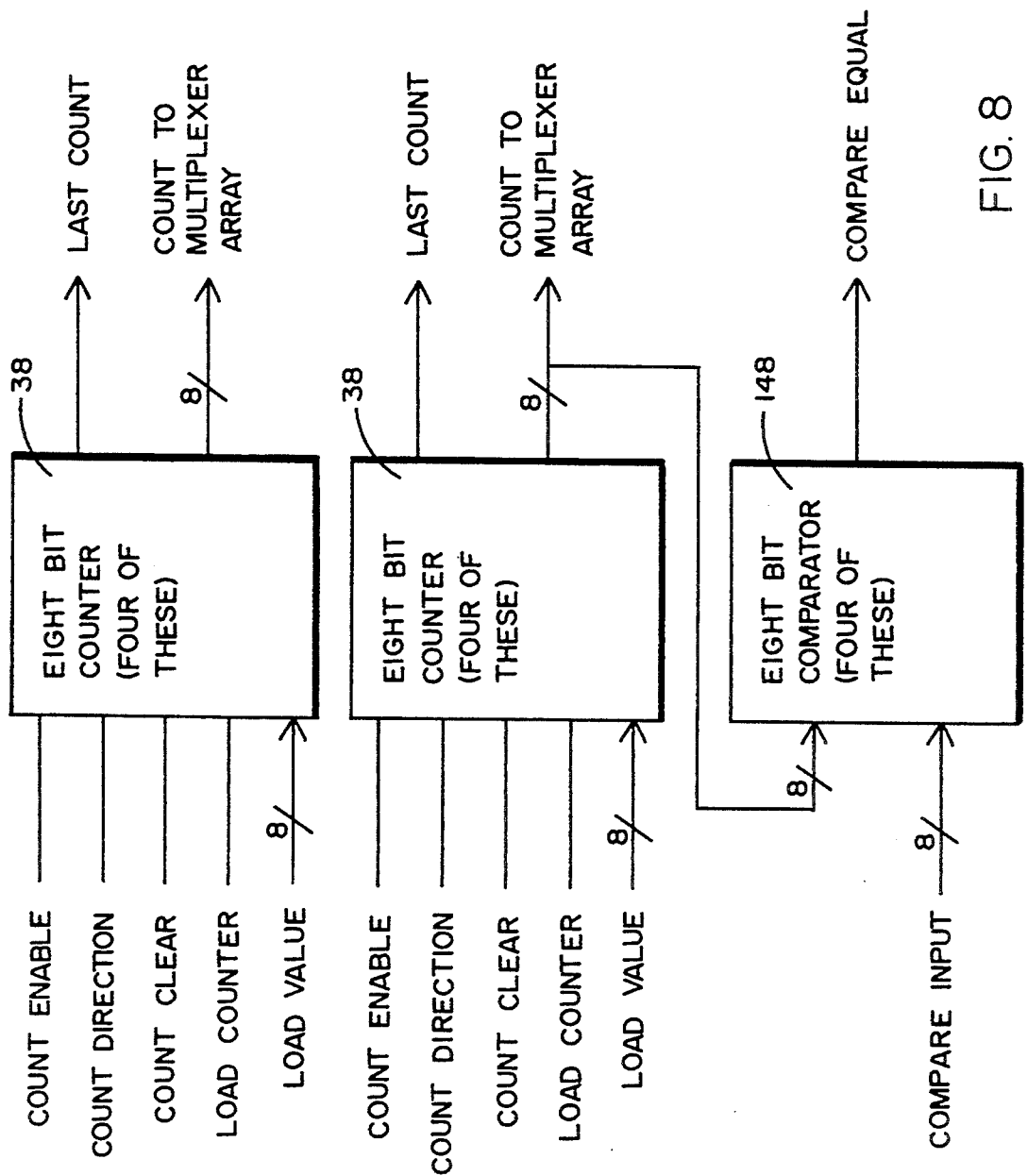
FIG. 8 is a block diagram of the counters.

As shown in FIG. 8, the CPP of this invention has eight 8-bit counters 38 that are used for addressing the RAMs, loop counting, accumulating carries from the adders and ALUs, and other counting functions. Four of the counters have dedicated comparators 148 that allow the counters to detect that a value other than last count has been reached. This is used frequently for generating RAM addressing. Each of the counters can be enabled, cleared, or loaded from the control circuitry of FIG. 2. The load value, comparator input, and up or down direction of the counters are programmable. The output of the counters goes to the data path multiplexers 44 (FIG. 1b–d–d–d) and can be used as a data value as well as RAM addressing.

Figure 9:
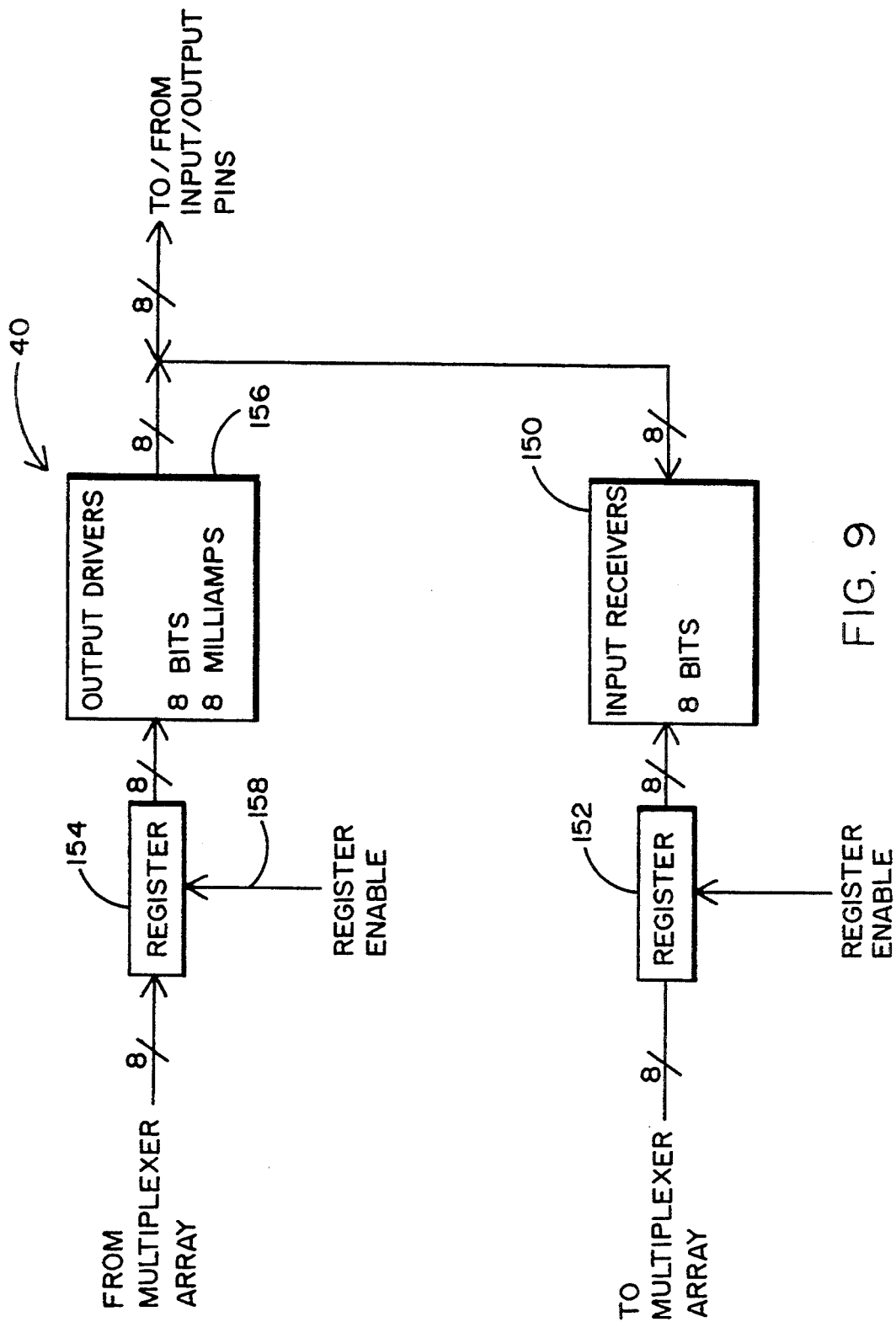
FIG. 9 is a block diagram of the I/O circuits.

In the I/O circuits 40' (FIG. 9), the input port data received by receivers 150 is registered at 152 and then is routed to the data path multiplexers 44. The output port data comes from the data path multiplexers 46 and is registered at 154 before going to the output driver 156. The input and output port registers and output driver enable 158 can be controlled on a clock by clock basis. The input is wrapped around in such a way that it can be read during output as well as during input operations.

In addition to the I/O circuits 40, the CPP of this invention includes four conventional 8-bit output circuits 42 (FIG. 1b–d). Normally, each pair of output ports provides the address to one of the RAMs 56, 58, but the outputs can be used in other ways since the output port data comes from the data path multiplexers 46. The output data is registered before going to the output driver. The output driver enable can be controlled on a clock-by-clock basis. The output data is wrapped around to a test point multiplexer (not shown) so that it can be read during self test.

FIG. 10 shows the interaction between the CPP 160 of the preferred embodiment and the RAMs 56, 58 as well as the outside world. The CPP chip 160 is designed to work at high computational rates with a large amount of data. Since moving data in and out of the CPP chip 160 or any processor is usually a performance-limiting factor, the architecture shown in FIG. 10 provides two banks 56, 58 of RAM memory to allow the internal components of CPP chip 160 to be fully utilized in many applications. In the preferred embodiment of the invention, the maximum addressable space using this architecture is 128K for each of the RAMs 56, 58. Four billion 32-bit words can be addressed by changing the architecture to combine both address buses 162, 164 into one 34-bit bus and combining the input/output ports of CPP chip 160 to make one 32-bit port.

Because the CPP of this invention reduces the number of parts and cards, as well as the power requirements, weight and volume of a given hardware system, it makes it practical to perform functions that could not previously be performed economically in real time on a programmable system. Also, the CPP can be used immediately in a variety of systems without requiring the design effort for a custom part, and design changes in the system do not require hardware rework.

We claim:

1. A configurable programmable processor, comprising:
   a) a circuit chip;
   b) computational circuit means on said chip for performing computations;
   c) a plurality of first multiplexer means on said chip for selectively connecting said computational circuit means to iteratively calculate selectable algorithms, each of said first multiplexer means having at least one input and at least one output;
   d) a plurality of second multiplexer means on said chip for controlling the interconnections of said first multiplexer means;
   e) means enabling any output of any of said first multiplexer means to be selectably directly unidirectionally interconnected with any input of any of said first multiplexer means by said second multiplexer means;
   f) latch register means on said chip for supplying, during iterative computations, a plurality of selectable control values to each of said second multiplexer means, said latch register means including means causing said latch register means to be programmable from outside of said chip; and
   g) control means on said chip for controlling the selection of said control values by said second multiplexer means independently of any control input from outside said chip.

2. The processor of claim 1, further comprising a control line connected to said second multiplexer means, said second multiplexer means being arranged to switch from one configuration to another by applying to said second multiplexer means on said control line a single address value.

3. The processor of claim 1, further comprising a source of configuration-identifying very long instruction words (VLIWs) connected to said chip from the outside thereof, said control means being arranged to load a plurality of said from said source onto said chip, and to switch said computational circuit means between the configurations identified thereby without any input from outside said chip.

4. The processor of claim 3, in which a predetermined one of said VLIWs is selected by said control means when said computational circuit means are in a predetermined status.

5. The processor of claim 3, in which at least some of said computational means include selectable delay means for delaying by a selectable amount of time the data processed by said computational means, the selection of said delay means being done by said control means.

6. The processor of claim 3, in which said control means are themselves configurable by said VLIWs.

7. The processor of claim 1, in which said first multiplexer means include first-level and second-level multiplexers, said first-level multiplexers having inputs connected to the outputs of said computational circuit means, and outputs connected to said second-level multiplexers; and said second-level multiplexers having inputs connected to outputs of said first-level multiplexers, and outputs connected to said computational circuit means.

8. The processor of claim 7, in which there is one second-level multiplexer for each input of at least some of said computational circuit means.

9. A configurable programmable processor, comprising:
  a) a circuit chip;
  b) a plurality of computational circuits disposed on said chip for carrying out individual arithmetic operations,
  c) means enabling any output of any of each of said computational circuits to be selectively unidirectionally interconnected with any input of any other of said computational circuits to form selectable computational circuit configurations;
  d) a plurality of control circuits disposed on said chip for individually establishing selected interconnections between said computational circuits and controlling their operation, said control circuits being selectively interconnectable with each other to form selectable control circuit configurations;
  e) an input for inputting to said chip a plurality of very long instruction words (VLIWs) each defining a specific set of interconnections of said computational circuits and said control circuits; and
  f) a set of registers on said chip for storing said VLIWs;
  g) said control circuits and computational circuits being arranged to change configurations in response to a predetermined status of said control and computation circuits and in accordance with said VLIWs;
  h) whereby said chip is enabled to perform selectable iterative computations without any input from outside said chip.

* * * * *